US011234186B2

(12) United States Patent
Arikawa et al.

(10) Patent No.: US 11,234,186 B2
(45) Date of Patent: Jan. 25, 2022

(54) SCHEDULING APPARATUS AND METHOD, AND PROGRAM

(71) Applicant: NIPPON TELEGRAPH AND TELEPHONE CORPORATION, Tokyo (JP)

(72) Inventors: Yuki Arikawa, Tokyo (JP); Takeshi Sakamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 79 days.

(21) Appl. No.: 16/767,529

(22) PCT Filed: Nov. 30, 2018

(86) PCT No.: PCT/JP2018/044143
§ 371 (c)(1),
(2) Date: May 27, 2020

(87) PCT Pub. No.: WO2019/111813
PCT Pub. Date: Jun. 13, 2019

(65) Prior Publication Data
US 2021/0176701 A1    Jun. 10, 2021

(30) Foreign Application Priority Data
Dec. 4, 2017    (JP) .............................. JP2017-232600

(51) Int. Cl.
*H04W 48/00* (2009.01)
*H04W 48/16* (2009.01)
(Continued)

(52) U.S. Cl.
CPC ........... *H04W 48/17* (2013.01); *H04W 48/16* (2013.01); *H04W 72/121* (2013.01); *H04W 72/1263* (2013.01); *H04W 88/10* (2013.01)

(58) Field of Classification Search
CPC ... H04W 48/17; H04W 48/16; H04W 72/121; H04W 72/1263; H04W 88/10;
(Continued)

(56) References Cited

U.S. PATENT DOCUMENTS 9,681,324 B2*   6/2017   Baligh ................. H04W 24/10
2014/0348096 A1  11/2014  Nagata et al.
2015/0029951 A1*  1/2015   Sano ......................... H04B 1/62
                                                              370/329

FOREIGN PATENT DOCUMENTS

GN      103931234 A        7/2014
JP      2013-110671 A      6/2013
(Continued)

OTHER PUBLICATIONS

Girici et al., "Proportional Fair Scheduling Algorithm in OFDMA-Based Wireless Systems with QoS Constraints", Journal of Communications and Networks, vol. 12, No. 1, Feb. 2010, pp. 30-42.
International Preliminary Reporton Patentability received for PCT Patent Application No. PCT/JP2018/044143, dated Jun. 18, 2020, 10 pages (6 pages of English Translation and 4 pages of Original Document).
(Continued)

*Primary Examiner* — Ricardo H Castaneyra
(74) *Attorney, Agent, or Firm* — Womble Bond Dickinson (US) LLP

(57) ABSTRACT

A search range decision unit (103) first decides, as a narrow-down count, the number of transmission points for which each of user wireless terminals becomes a connection candidate, based on the number of user wireless terminals that perform wireless communication with one of the plurality of transmission points. In addition, the search range decision unit (103) limits, based on combination conditions stored in a storage unit (102), the number of the plurality of transmission points that can be combined with one of the user wireless terminals according to the narrow-down count, and sets combination limitation information that associates the plurality of transmission points with the user wireless ter-
(Continued)

minals that are the connection candidates for each of the plurality of transmission points.

17 Claims, 7 Drawing Sheets

(51) Int. Cl.
*H04W 72/12* (2009.01)
*H04W 88/10* (2009.01)

(58) Field of Classification Search
CPC ..... H04W 24/10; H04W 24/02; H04W 16/02; H04L 5/0035; H04B 7/024
See application file for complete search history.

(56) References Cited

FOREIGN PATENT DOCUMENTS

| JP | 2015-231079 A | 12/2015 |
|----|---------------|---------|
| WO | 2013/077392 A1 | 5/2013 |

OTHER PUBLICATIONS

International Search Report and Written Opinion received for PCT Patent Application No. PCT/JP2018/044143, dated Feb. 12, 2019, 10 pages (5 pages of English Translation and 5 pages of Original Document).
Taoka et al., "MIMO and CoMP in LTE-Advanced", NTT DOCOMO Technical Journal, vol. 18, No. 2, 2010, 18 pages (9 pages of English Translation and 9 pages of Original Document).

* cited by examiner

SCHEDULING APPARATUS AND METHOD, AND PROGRAM

TECHNICAL FIELD

The present invention relates to a scheduling apparatus and method configured to allocate a wireless resource of a wireless network, and a program.

BACKGROUND ART

The widespread use of wireless terminals such as smartphones prompts greater social demands for a wireless network such as improvement of a communication speed and more usable frequency bands. In such circumstances and backgrounds, a wireless network system using wireless interface specifications of a next-generation mobile communication method called LTE (Long Term Evolution) is becoming more widespread. In the LTE, as one of wireless access techniques, CoMP (Coordinated Multi-Point transmission/reception) is employed in which a plurality of transmission points (TP) cooperatively transmit/receive signals to/from a user wireless terminal (see non-patent literature 1). Note that in general, a plurality of transmission points exist for a single base station.

The CoMP technique is one of the important techniques for improving the frequency use efficiency or cell end user throughput. For example, in downlink communication that is transmission from transmission points to user wireless terminals, when a plurality of transmission points make transmission to the user wireless terminals using the same frequency band, the wireless resource use efficiency can be increased.

However, in a case in which the transmission points transmit signals to different user wireless terminals, for a user wireless terminal capable of receiving signals from a plurality of transmission points, signals from other transmission points may interfere with a desired reception signal, resulting in a decrease in throughput. Hence, the CoMP is an essential technique for improving the communication speed while suppressing such interference.

Additionally, to maximize system throughput when applying CoMP to a wireless network, resource allocation to a user (user wireless terminal) having an excellent reception state is preferentially performed, which causes a problem concerning fairness among the users. For this reason, it is said that scheduling which takes into account the average rate of each user wireless terminal up to the present time is preferably performed (see non-patent literature 2).

RELATED ART LITERATURE

Non-Patent Literature

Non-Patent Literature 1: Taoka Hidekazu et al., "MIMO and CoMP in LTE-Advanced", NTT DOCOMO Technical Journal, Vol. 18, No. 2, pp. 22-30, 2010.
Non-Patent Literature 2: T. Girici et al., "Proportional Fair Scheduling Algorithm in OFDMA-Based Wireless Systems with QoS Constraints", Journal of Communications and Networks, vol. 12, no. 1, pp. 30-42, 2010.

DISCLOSURE OF INVENTION

Problem to be Solved by the Invention

In the wireless network system, when performing scheduling as described above, a scheduling apparatus decides, as the combination of a transmission point and a user wireless terminal, which maximizes the evaluation value of communication quality, the transmission state of each transmission point, that is, information for designating a user wireless terminal as a transmission destination or transmission stop for each transmission point. To decide the combination, it is necessary to perform processing of calculating the evaluation values of the combinations of a number of transmission points and user wireless terminals and searching for a combination of the highest evaluation value and complete the combination decision within a scheduling period (for example, within a time of 1 msec).

As a reliable method of acquiring an optimum combination, evaluation values are calculated for all possible combinations, and a combination of the maximum evaluation value is searched for. That is, a round-robin search is performed. However, when the scale of the wireless network (the number of included base stations and the number of user wireless terminals) becomes larger, the number of combinations that can be the candidates becomes enormous. Hence, in the conventional scheduling apparatus of the wireless network system, when the scale of the wireless network system becomes larger, it will take a longer time until an optimum combination is found, and it is impossible to decide the optimum combination within the scheduling period.

The present invention has been made to solve the above-described problem, and has as its object to more quickly decide the optimum combination of a transmission point and a user wireless terminal.

Means of Solution to the Problem

According to the present invention, there is provided a scheduling apparatus that comprises a storage unit configured to store combination conditions in each of which each of a plurality of transmission points configured to perform wireless communication with a user wireless terminal is associated with the user wireless terminal that is a connection candidate for the plurality of transmission points, a search range decision unit configured to decide, as a narrow-down count, the number of transmission points for which each of user wireless terminals becomes a connection candidate based on the number of user wireless terminals that perform wireless communication with one of the plurality of transmission points, limit, based on the combination conditions stored in the storage unit, the number of the plurality of transmission points that can be combined with one of the user wireless terminals according to the narrow-down count, and set combination limitation information that associates the plurality of transmission points with the user wireless terminals that are the connection candidates for each of the plurality of transmission points, a combination generation unit configured to generate candidates of combinations of the plurality of transmission points and the user wireless terminals based on the combination limitation information, an evaluation value calculation unit configured to calculate, based on a standard that is set in advance, an evaluation value for each of the candidates of the combinations generated by the combination generation unit, and a holding unit configured to hold a combination selected based on the evaluation value calculated by the evaluation value calculation unit.

Additionally, according to the present invention, there is provided a scheduling method that comprises a first step of storing, in a storage unit, combination conditions in each of which each of a plurality of transmission points configured to perform wireless communication with a user wireless terminal is associated with the user wireless terminal that is a connection candidate for the plurality of transmission points, a second step of deciding, as a narrow-down count, the number of transmission points for which each of user wireless terminals becomes a connection candidate based on the number of user wireless terminals that perform wireless communication with one of the plurality of transmission points, limiting, based on the combination conditions stored in the storage unit, the number of the plurality of transmission points that can be combined with one of the user wireless terminals according to the narrow-down count, and setting combination limitation information that associates the plurality of transmission points with the user wireless terminals that are the connection candidates for each of the plurality of transmission points, a third step of generating candidates of combinations of the plurality of transmission points and the user wireless terminals based on the combination limitation information, a fourth step of calculating, based on a standard that is set in advance, an evaluation value for each of the candidates of the combinations generated in the third step, and a fifth step of holding a combination selected based on the evaluation value calculated in the fourth step.

A program according to the present invention is a program used by a computer to execute the above-described scheduling method, and is a program configured to cause the computer to function as a storage unit, a search range decision unit, a combination generation unit, an evaluation value calculation unit, and a holding unit provided in the above-described scheduling apparatus.

Effect of the Invention

As described above, according to the present invention, the narrow-down count is decided based on the number of target user wireless terminals, and the number of a plurality of transmission points that can be combined with a single user wireless terminal is restricted according to the decided narrow-down count which is obtained based on a combination condition. It is therefore possible to obtain an excellent effect of reducing the time for deciding the optimum combination of a transmission point and a user wireless terminal.

BEST MODE FOR CARRYING OUT THE INVENTION

Embodiments of the present invention will now be described.

First Embodiment

Figure 1:
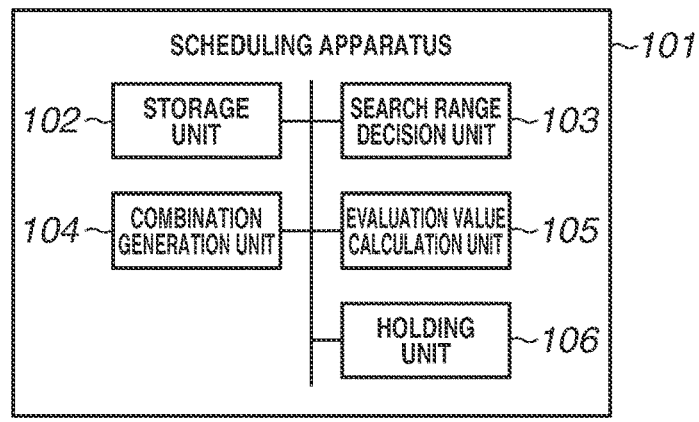
FIG. 1 is a block diagram showing the arrangement of a scheduling apparatus according to the first embodiment of the present invention.

A scheduling apparatus 101 according to the first embodiment of the present invention will be described first with reference to FIG. 1. The scheduling apparatus 101 includes a storage unit 102, a search range decision unit 103, a combination generation unit 104, an evaluation value calculation unit 105, and a holding unit 106. The scheduling apparatus 101 performs scheduling by searching for an optimum combination of one of a plurality of transmission points and a user wireless terminal, which is used to allocate a wireless resource to perform wireless communication, in a wireless network including a plurality of transmission points that perform wireless communication with user wireless terminals.

The storage unit 102 stores combination conditions in each of which each of a plurality of transmission points configured to perform wireless communication with a user wireless terminal is associated with the user wireless terminal that is a connection candidate for the plurality of transmission points.

The search range decision unit 103 first decides, as the narrow-down count, the number of transmission points for which each of the user wireless terminals becomes a connection candidate based on the number of user wireless terminals that perform wireless communication with one of the plurality of transmission points. Additionally, the search range decision unit 103 limits and restricts, based on combination conditions stored in the storage unit 102, the number of the plurality of transmission points that can be combined per one user wireless terminal to the narrow-down count, and sets combination limitation information that associates the plurality of transmission points with user wireless terminals that are connection candidates for each of the plurality of transmission points.

In the search range decision unit 103, for example, as shown in Table 1, a narrow-down count corresponding to a terminal count threshold is set in advance, and the narrow-down count is decided based on the number of target user wireless terminals. For example, when the number of target user wireless terminals is 10, it is smaller than a terminal count threshold of 32, and the narrow-down count is 8. In this example, the larger the number of target user wireless terminals is, the smaller the narrow-down count.

TABLE 1

| Terminal count threshold | Narrow-down count |
|---|---|
| 0 | 0 |
| 32 | 8 |
| 64 | 6 |
| 128 | 2 |
| 256 | 1 |

In addition, based on the combination conditions stored in the storage unit 102, the search range decision unit 103 sets combination limitation information that restricts the number of the plurality of transmission points that can be combined with one user wireless terminal based on the decided narrow-down count.

For example, as shown in Table 2 below, the storage unit 102 stores combination conditions in which connection candidates of user wireless terminals are associated with each transmission point.

TABLE 2

| Transmission point 0 | Transmission point 1 | Transmission point 2 | Transmission point 3 |
|---|---|---|---|
| User wireless terminal 0 | User wireless terminal 0 | User wireless terminal 0 | User wireless terminal 0 |
| User wireless terminal 1 | User wireless terminal 1 | User wireless terminal 2 | User wireless terminal 1 |
| User wireless terminal 2 | User wireless terminal 2 | User wireless terminal 3 | User wireless terminal 4 |
| User wireless terminal 3 | User wireless terminal 4 | User wireless terminal 7 | User wireless terminal 5 |
| User wireless terminal 4 | | | User wireless terminal 6 |
| | | | User wireless terminal 7 |

When the narrow-down count is 2, combination limitation information that restricts the number of the plurality of transmission points that can be combined with one user wireless terminal to 2 is being set, as shown in Table 3 below. The search range decision unit 103 executes the above-described setting of the narrow-down count and the setting of the combination limitation information for each scheduling cycle.

TABLE 3

| Transmission point 0 | Transmission point 1 | Transmission point 2 | Transmission point 3 |
|---|---|---|---|
| User wireless terminal 0 | User wireless terminal 1 | User wireless terminal 2 | User wireless terminal 0 |
| User wireless terminal 1 | User wireless terminal 4 | User wireless terminal 3 | User wireless terminal 5 |
| User wireless terminal 2 | | User wireless terminal 7 | User wireless terminal 6 |
| User wireless terminal 3 | | | User wireless terminal 7 |
| User wireless terminal 4 | | | |

The combination generation unit 104 generates candidates of combinations of the plurality of transmission points and the user wireless terminals based on the combination limitation information. The combination generation unit 104 generates the combinations of the transmission points in the combination limitation information and the user wireless terminals as the connection candidates for each transmission point by a predetermined search algorithm. For example, the combination generation unit 104 generates a combination candidate by selecting a transmission point in accordance with the wireless radio wave state of each of the plurality of transmission points. In the combination operation of the combination generation unit 104, for example, the combination generation can be stopped at a point of time when a predetermined time has elapsed from the start time of combination generation or at a point of time when generation of a predetermined number of combinations is ended.

As the combination generation method of the combination generation unit 104, a generally known search algorithm can be used. For example, a round-robin method of comprehensively generating all combinations or a generally known approximate solution method (for example, a hill climbing method, a greedy algorithm, or the like) of a combinatorial optimization problem can be applied. When generating combinations, combinations in which each transmission point is set in a transmission stop state are also generated.

The evaluation value calculation unit 105 calculates an evaluation value for each of the combination candidates generated by the combination generation unit 104, based on a standard that is set in advance. The evaluation value is, for example, a value obtained by evaluating the quality of communication between a transmission point and a user wireless terminal that is a connection candidate for the transmission point. The evaluation value calculation unit 105 calculates the evaluation value based on a set evaluation value calculation formula.

As the above-described evaluation value, for example, the sum of the wireless throughputs of the transmission points, that is, the wireless throughput value of the entire wireless network system can be used. In addition, a value (Proportional Fairness (PF) metric) obtained by dividing a throughput value obtained when performing transmission in a combination of a transmission point and a user wireless terminal by an average throughput value integrated for a predetermined period, which is generally used in a wireless network system, can be used as the evaluation value.

For example, in the calculation of the evaluation value by the evaluation value calculation unit 105, the reception SINR (Signal-to-Interference plus Noise power Ratio) is estimated, and a throughput according to the reception SINR is obtained (for example, a table that associates a reception SINR with a throughput is looked up). In the calculation of the reception SINR, the values of the interference power and the signal power of each user terminal are needed. A reception power obtained when a user terminal receives a signal transmitted from each transmission point is measured, and the values are estimated from the measured value and a resource assignment pattern. Note that as the measured value, not the reception power value measured by the user terminal but a value obtained by converting a CQI (Channel Quality Indicator) that the user terminal notifies a base station via an uplink channel into a reception power value or a value estimated from a reception power value obtained when each transmission point has received an uplink signal transmitted from the user terminal can also be used.

The holding unit 106 holds a combination selected based on the evaluation value calculated by the evaluation value calculation unit 105. For example, when a value such as a wireless throughput obtained by evaluating the quality of communication between a transmission point and a user wireless terminal that is a connection candidate for the transmission point is used as the evaluation value, the holding unit 106 holds a combination for which the evaluation value calculated by the evaluation value calculation unit 105 is the highest. When the calculated evaluation value is greater than the evaluation value of the combination held so far, the holding unit 106 updates the held combination to the combination of the newly calculated evaluation value. In addition, when the calculated evaluation value is smaller than the evaluation value of the combination held so far, the holding unit 106 does not update the combination.

Figure 2:
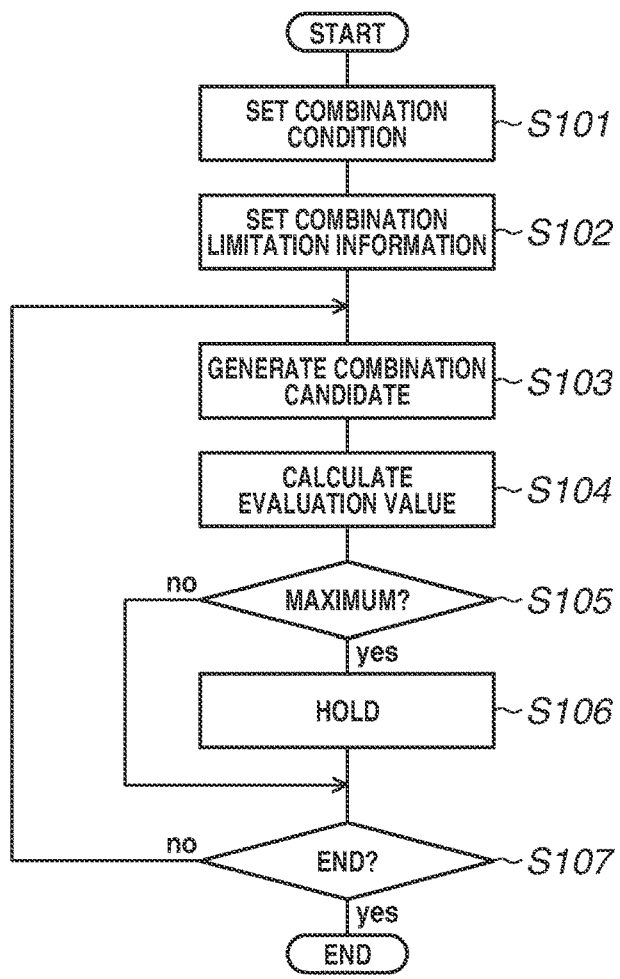
FIG. 2 is a flowchart for explaining a scheduling method according to the first embodiment of the present invention.

The operation (scheduling method) of the scheduling apparatus according to the first embodiment will be described next with reference to the flowchart of FIG. 2.

First, in step S101, combination conditions in each of which each of a plurality of transmission points configured to perform wireless communication with a user wireless terminal is associated with the user wireless terminal that is a connection candidate for the plurality of transmission points are stored in the storage unit 102 (first step). Next, in step S102, the search range decision unit 103 decides, as the narrow-down count, the number of transmission points for which each of the user wireless terminals becomes a connection candidate based on the number of user wireless terminals that perform wireless communication with one of the plurality of transmission points, restricts, based on the combination conditions stored in the storage unit 102, the number of the plurality of transmission points that can be combined with one user wireless terminal to the narrow-down count, and sets combination limitation information that associates the plurality of transmission points with user wireless terminals that are connection candidates for each of the plurality of transmission points (second step).

In step S103, the combination generation unit 104 generates candidates of combinations of the plurality of transmission points and the user wireless terminals based on the combination limitation information (third step). In step S104, the evaluation value calculation unit 105 calculates an evaluation value for each of the combination candidates generated by the combination generation unit 104 in the third step based on a standard that is set in advance (fourth step).

In step S105, the holding unit 106 first compares an already held evaluation value with the evaluation value newly calculated by the evaluation value calculation unit 105. When the evaluation value newly calculated by the evaluation value calculation unit 105 is larger (yes in step S105), in step S106, the holding unit 106 changes the held combination information to the combination for which the new evaluation value is calculated. Steps S103 to S106 described above are repetitively executed until the end (step S107). Note that the holding unit 106 holds a combination selected based on the calculated evaluation value not only in a case in which the evaluation value calculated in the fourth step is large but also in a case in which the evaluation value is small (fifth step).

Figure 3:
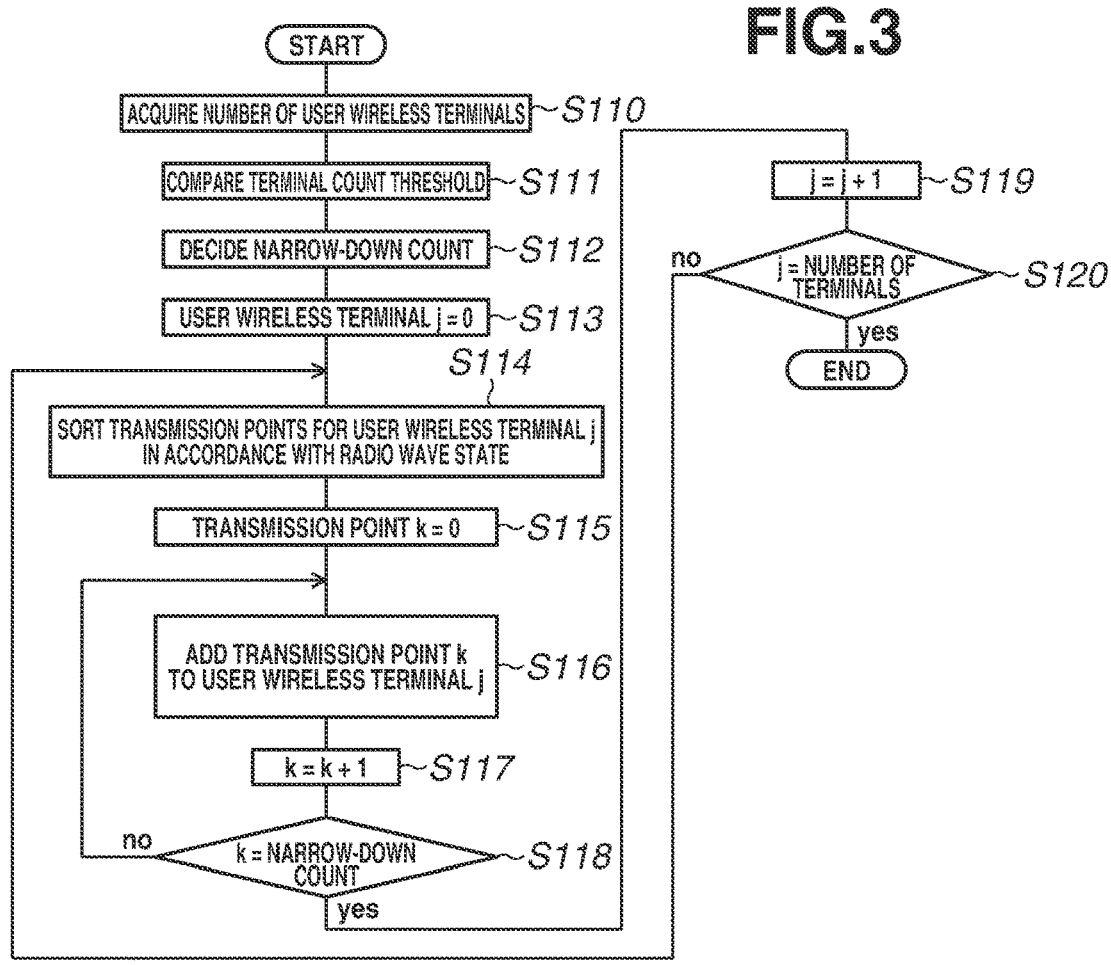
FIG. 3 is a flowchart more specifically showing search range decision of the scheduling method according to the first embodiment of the present invention.

The procedure of setting of combination limitation information by the search range decision unit 103 will be described here in more detail with reference to the flowchart of FIG. 3. First, in step S110, the number of user wireless terminals as the target of scheduling is acquired. Next, in step S111, the acquired number of user wireless terminals and a terminal count threshold set in advance in ascending order or descending order are compared. Next, in step S112, a narrow-down count corresponding to the terminal count threshold including the number of target user wireless terminals is decided.

In step S113, an identification number j of a user wireless terminal is set to 0. In step S114, for the user wireless terminal of the identification number j, corresponding transmission points are sorted in accordance with the quality of the radio wave state.

In step S115, an identification number k of a transmission point is set to 0. In step S116, the transmission point of the identification number k is added to the user wireless terminal of the identification number j. In step S117, k is incremented by one.

In step S118, it is determined whether k has reached the narrow-down count. When k has not reached the narrow-down count (no in step S118), the process returns to step S116, and steps S116 and S117 are repeated. On the other hand, when k has reached the narrow-down count (yes in step S118), the process advances to step S119 to increment j by one.

In step S120, it is determined whether j has reached the number of terminals. When j has not reached the number of terminals (no in step S120), the process returns to step S114, and steps S114 to S119 are repeated.

On the other hand, when j has reached the number of terminals (yes in step S120), the processing ends. By steps S110 to S120 described above, a terminal list (combination limitation information) in which corresponding user wireless terminals are allocated to each transmission point is set (generated).

Results of simulating an effect according to the first embodiment will be described next. Parameters in the simulations were set as shown in Table 4 below.

TABLE 4

| Parameters | Values |
| --- | --- |
| System bandwidth | 100 MHz |
| Carrier frequency | 3.5 GHz |
| Transmission power | 30 dBm |
| Antenna/terminal arrangement | Even distribution in a circle with a radius of 155 m |
| Minimum distance between antennas | 20 m |
| Antenna height/terminal height | 10 m/1.5 m |
| Antenna structure | Omni-antenna |
| Traffic model | Full buffer |
| Propagation attenuation | LOS: 22.0log10 (R) + 28.0 + 20.0log10 (Fc) dB NLOS: 36.7log10 (R) + 22.7 + 26.0log10 (Fc) dB |
| Fading | Rayleigh |
| Shadowing standard deviation | LOS: 3 dB NLOS: 4 dB |
| Noise index | 9 dB |
| Noise power density | −174 dBm/Hz |

Figure 4:
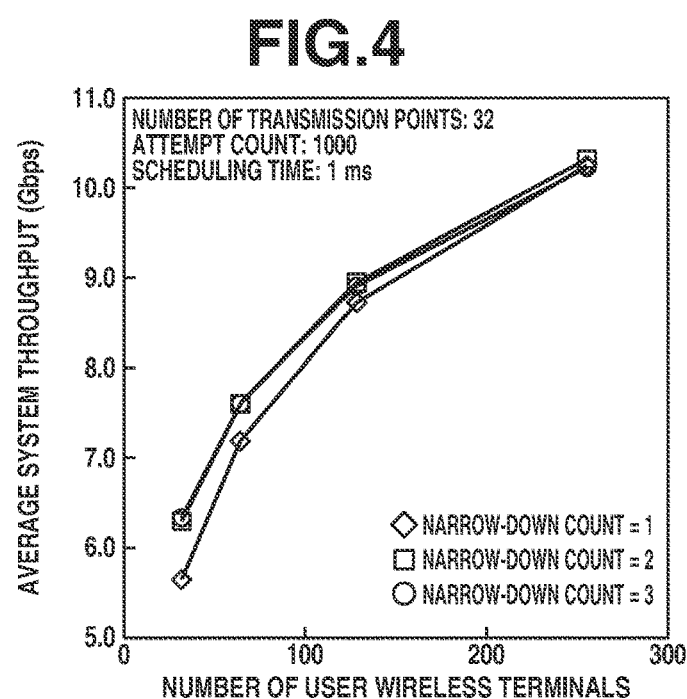
FIG. 4 is a graph showing the results of simulations using the scheduling apparatus according to the first embodiment.

The results of simulations with the above-described settings are shown in FIG. 4. As shown in FIG. 4, when the number of user wireless terminals is 32, for example, the number of transmission points (narrow-down count) as the connection candidates for each user wireless terminal is set to 3. As compared to a case in which the narrow-down count is 1, a satisfactory average system throughput can be obtained, as can be seen. When the number of search target transmission points is large, the number of user wireless terminals as the connection candidates for each user wireless terminal is decreased. Since the number of combination candidates decreases, the optimum combination can be specified in a short time. For example, when the number of user wireless terminals is 256, the narrow-down count is set to 2. As compared to a case in which the narrow-down count is 3, the average system throughput improves slightly.

As described above, according to the first embodiment, the narrow-down count is decided based on the number of target user wireless terminals, and the number of the plurality of transmission points that can be combined with one user wireless terminal is restricted to the decided narrow-down count that is obtained based on combination conditions. It is therefore possible to more quickly decide the optimum combination of a transmission point and a user wireless terminal.

According to the first embodiment, the number of transmission points as the connection candidates for each user wireless terminal can dynamically be changed in accordance with the number of search target user wireless terminals. For example, when the number of search target user wireless terminals is small, the number of transmission points as the connection candidates for each user wireless terminal is increased. This makes it possible to select a more optimum combination in the entire system and improve the system throughput. In addition, when the number of search target user wireless terminals is large, the number of user wireless terminals as the connection candidates for each transmission point is decreased. Since the number of combination candidates decreases, an optimum combination can be specified in a short time. Furthermore, when the search range decision processing is performed for each scheduling cycle at the shortest, the processing can dynamically cope with the number of search target user wireless terminals, which changes each moment. Hence, the optimum combination can always be specified as compared to a case in which the narrow-down count is statically set.

Second Embodiment

Figure 5:
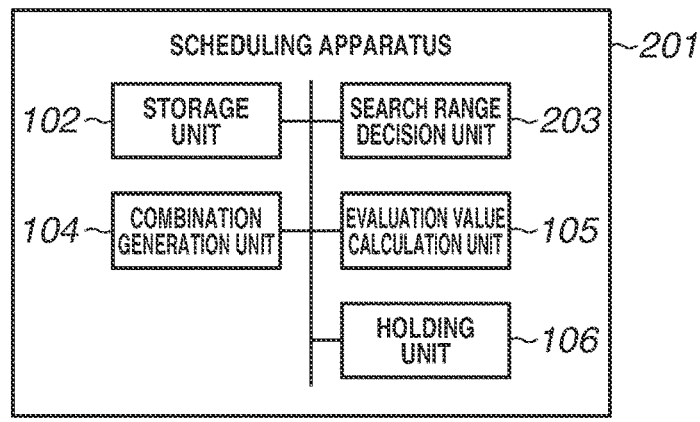
FIG. 5 is a block diagram showing the arrangement of a scheduling apparatus according to the second embodiment of the present invention.

A scheduling apparatus 201 according to the second embodiment of the present invention will be described next with reference to FIG. 5. The scheduling apparatus 201 includes a storage unit 102, a search range decision unit 203, a combination generation unit 104, an evaluation value calculation unit 105, and a holding unit 106. The scheduling apparatus 201 performs scheduling by searching for an optimum combination of one of a plurality of transmission points and a user wireless terminal, which is used to allocate a wireless resource to perform wireless communication, in a wireless network including a plurality of transmission points that perform wireless communication with user wireless terminals.

The storage unit 102, the combination generation unit 104, the evaluation value calculation unit 105, and the holding unit 106 are the same as in the above-described first embodiment. In the second embodiment, the search range decision unit 203 limits and restricts, based on combination conditions stored in the storage unit 102, the number of the plurality of transmission points that can be combined with one user wireless terminal to a narrow-down count, and additionally, sets combination limitation information in a state in which only a retransmission user wireless terminal is combined with a transmission point that is to be combined with a retransmission user wireless terminal as a retransmission target.

The search range decision unit 103 according to the first embodiment sets the combination limitation information as shown in Table 3. In addition, according to the search range decision unit 203 of the second embodiment, the combination limitation information is limited to a state in which only a retransmission user wireless terminal is combined with a transmission point that is to be combined with a retransmission user wireless terminal as a retransmission target. For example, when user wireless terminal 2 and user wireless terminal 5 are retransmission targets, the combination limitation information shown in Table 3 is further restricted, and combination limitation information shown in Table 5 or 6 below is set.

TABLE 5

| Transmission point 0 | Transmission point 1 | Transmission point 2 | Transmission point 3 |
|---|---|---|---|
| User wireless terminal 2 | User wireless terminal 1<br>User wireless terminal 4 | User wireless terminal 3<br>User wireless terminal 7 | User wireless terminal 5 |

TABLE 6

| Transmission point 0 | Transmission point 1 | Transmission point 2 | Transmission point 3 |
|---|---|---|---|
| User wireless terminal 0<br>User wireless terminal 1<br>User wireless terminal 3<br>User wireless terminal 4 | User wireless terminal 1<br>User wireless terminal 4 | User wireless terminal 2 | User wireless terminal 5 |

Here, in the state shown in Table 3, transmission point 0 and transmission point 2 are selected for user wireless terminal 2. In the second embodiment, the transmission point that is combined with user wireless terminal 2 of a retransmission target is restricted to one. In this restriction, for example, a transmission point having a better wireless radio wave state is selected. For example, Table 5 shows a case in which the wireless radio wave state concerning user wireless terminal 2 is better in transmission point 0. On the other hand, Table 6 shows a case in which the wireless radio wave state concerning user wireless terminal 2 is better in transmission point 2.

The transmission point at the time of first transmission can also be selected. For example, Table 5 shows a case in which the first transmission to user wireless terminal 2 is performed by the transmission point 0. On the other hand, Table 6 shows a case in which the first transmission to user wireless terminal 2 is done by the transmission point 2.

Figure 6:
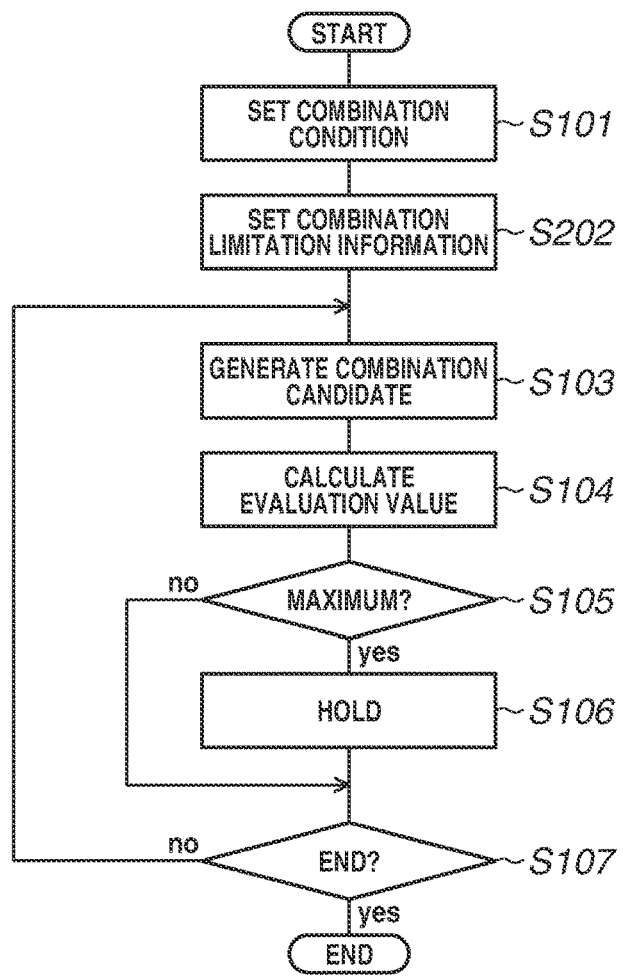
FIG. 6 is a flowchart for explaining a scheduling method according to the second embodiment of the present invention.

The operation (scheduling method) of the scheduling apparatus according to the second embodiment will be described next with reference to the flowchart of FIG. 6.

First, in step S101, combination conditions in each of which each of a plurality of transmission points configured to perform wireless communication with a user wireless terminal is associated with the user wireless terminal that is a connection candidate for the plurality of transmission points are stored in the storage unit 102 (first step). This is the same as in the above-described first embodiment.

In the second embodiment, next, in step S202, the search range decision unit 203 decides the narrow-down count based on the number of target user wireless terminals in accordance with preset narrow-down conditions, restricts, based on the combination conditions stored in the storage unit 102, the number of the plurality of transmission points that can be combined with one user wireless terminal to the decided narrow-down count, and additionally sets combination limitation information in a state in which only a retransmission user wireless terminal is combined with a transmission point that is to be combined with a retransmission user wireless terminal as a retransmission target (second step).

The subsequent processing is the same as in the above-described first embodiment. In step S103, the combination generation unit 104 generates candidates of combinations of the plurality of transmission points and the user wireless terminals based on the combination limitation information (third step). In step S104, the evaluation value calculation unit 105 calculates an evaluation value for each of the combination candidates generated by the combination generation unit 104 in the third step based on a standard that is set in advance (fourth step).

In step S105, the holding unit 106 first compares an already held evaluation value with the evaluation value newly calculated by the evaluation value calculation unit 105. When the evaluation value newly calculated by the evaluation value calculation unit 105 is greater (yes in step S105), in step S106, the holding unit 106 changes the held combination information to the combination for which the new evaluation value is calculated. Steps S103 to S106 described above are repetitively executed until the end (step S107).

In the above-described second embodiment as well, the narrow-down count is decided based on the number of target user wireless terminals, and the number of the plurality of transmission points that can be combined with a single user wireless terminal is restricted to the decided narrow-down count which is obtained based on combination conditions. It is therefore possible to more quickly decide the optimum combination of a transmission point and a user wireless terminal.

In the second embodiment, the number of transmission points as the connection candidates for each user wireless terminal is narrowed down based on retransmission target user wireless terminal information. For this reason, as compared to the first embodiment, the number of transmission points as the connection candidates for each user wireless terminal can dynamically be changed in consideration of the retransmission target user wireless terminal for which the combination of transmission is already determined. For example, when the number of retransmission target user wireless terminals is large, there are already many transmission points in which the combination of transmission has already been determined regardless of performing the search processing. This makes it possible to increase the number of transmission points as the connection candidates for each user wireless terminal, select a more optimum combination in the entire system, and improve the system throughput.

Furthermore, when the combination limitation information setting is performed for each scheduling cycle at the shortest, the processing can dynamically cope with the number of retransmission target user wireless terminals, which changes each moment. Hence, the optimum combination can be specified as compared to a case in which the narrow-down count is statically set or the first embodiment.

Third Embodiment

Figure 7:
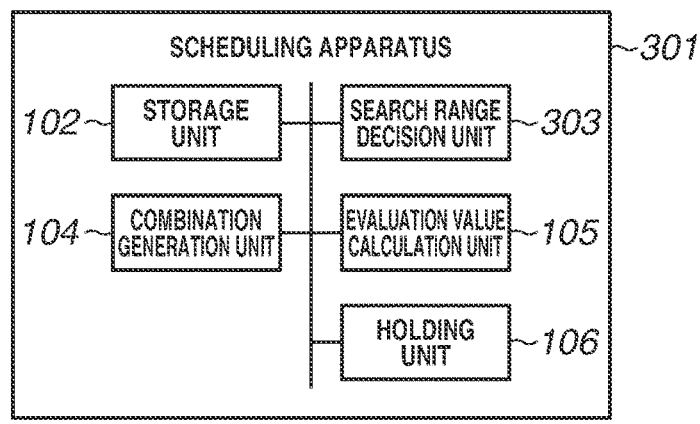
FIG. 7 is a block diagram showing the arrangement of a scheduling apparatus according to the third embodiment of the present invention.

A scheduling apparatus 301 according to the third embodiment of the present invention will be described next with reference to FIG. 7. The scheduling apparatus 301 includes a storage unit 102, a search range decision unit 303, a combination generation unit 104, an evaluation value calculation unit 105, and a holding unit 106. The scheduling apparatus 301 performs scheduling by searching for an optimum combination of one of a plurality of transmission points and a user wireless terminal, which is used to allocate a wireless resource to perform wireless communication, in a wireless network including a plurality of transmission points that perform wireless communication with user wireless terminals.

The storage unit 102, the combination generation unit 104, the evaluation value calculation unit 105, and the holding unit 106 are the same as in the above-described first embodiment. In the third embodiment, the search range decision unit 303 limits and restricts, based on combination conditions stored in the storage unit 102, the number of the plurality of transmission points that can be combined with one user wireless terminal to a narrow-down count, and additionally, sets combination limitation information that restricts the number of user wireless terminals that can be combined with the plurality of transmission points to the narrow-down count.

The search range decision unit 103 according to the first embodiment sets the combination limitation information as shown in Table 3. In addition, according to the search range decision unit 303 of the third embodiment, in each transmission point as well, the number of user wireless terminals that can be combined is restricted to the narrow-down count. For example, when the narrow-down count is 2, the combination limitation information shown in Table 3 is further restricted. When the combination limitations shown in Table 3 are arranged in descending order of satisfactory channel information, combination limitation information shown in Table 7 below is set.

TABLE 7

| Transmission point 0 | Transmission point 1 | Transmission point 2 | Transmission point 3 |
|---|---|---|---|
| User wireless terminal 0 | User wireless terminal 1 | User wireless terminal 2 | User wireless terminal 0 |
| User wireless terminal 1 | User wireless terminal 4 | User wireless terminal 3 | User wireless terminal 5 |

Figure 8:
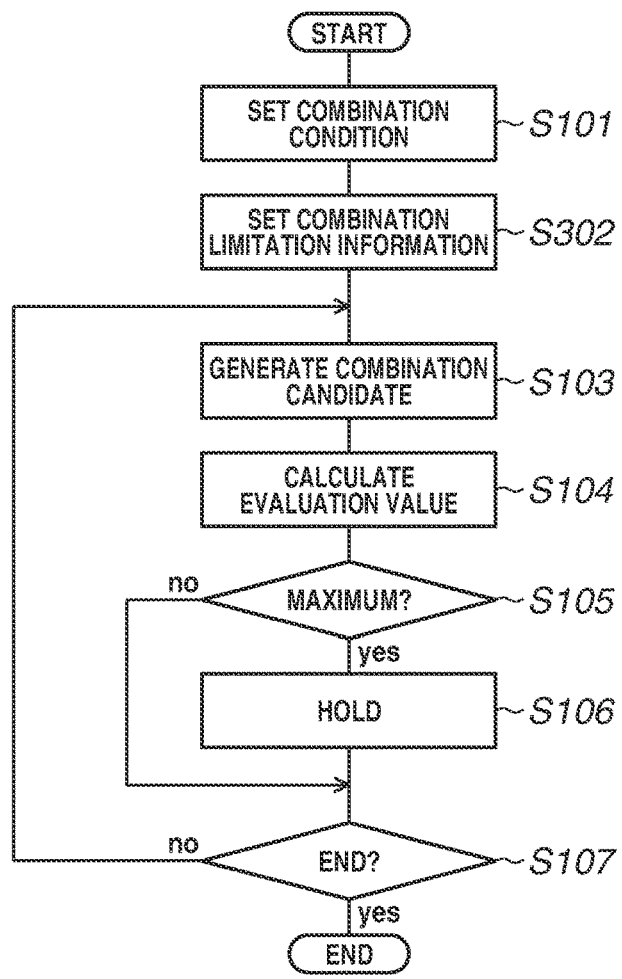
FIG. 8 is a flowchart for explaining a scheduling method according to the third embodiment of the present invention.

The operation (scheduling method) of the scheduling apparatus according to the third embodiment will be described next with reference to the flowchart of FIG. 8.

First, in step S101, combination conditions in each of which each of a plurality of transmission points configured to perform wireless communication with a user wireless terminal is associated with the user wireless terminal that is a connection candidate for the plurality of transmission points are stored in the storage unit 102 (first step). This is the same as in the above-described first embodiment.

In the third embodiment, next, in step S302, the search range decision unit 303 decides the narrow-down count based on the number of target user wireless terminals in accordance with preset narrow-down conditions, restricts, based on the combination conditions stored in the storage unit 102, the number of the plurality of transmission points that can be combined with one user wireless terminal to the decided narrow-down count, and additionally, sets combination limitation information that restricts the number of user wireless terminals that can be combined with the plurality of transmission points to the narrow-down count (second step).

The subsequent processing is the same as in the above-described first embodiment. In step S103, the combination generation unit 104 generates candidates of combinations of the plurality of transmission points and the user wireless terminals based on the combination limitation information (third step). In step S104, the evaluation value calculation unit 105 calculates an evaluation value for each of the combination candidates generated by the combination generation unit 104 in the third step based on a standard that is set in advance (fourth step).

In step S105, the holding unit 106 first compares an already held evaluation value with the evaluation value newly calculated by the evaluation value calculation unit 105. When the evaluation value newly calculated by the evaluation value calculation unit 105 is greater (yes in step S105), in step S106, the holding unit 106 changes the held combination information to the combination for which the new evaluation value is calculated. Steps S103 to S106 described above are repetitively executed until the end (step S107).

In the above-described third embodiment as well, the narrow-down count is decided based on the number of target user wireless terminals, and the number of the plurality of transmission points that can be combined with one user wireless terminal is restricted to the decided narrow-down count which is obtained based on combination conditions. It is therefore possible to more quickly decide the optimum combination of a transmission point and a user wireless terminal.

In the third embodiment, since the number of transmission points as connection candidates for each user wireless terminal is narrowed down, the user wireless terminals and the transmission points are unevenly distributed, as compared to the first embodiment. Even if connection candidate user wireless terminals are concentrated to some transmission points, an attempt to connect other transmission points can be made. This makes it possible to select an optimum combination in the entire system.

Fourth Embodiment

Figure 9:
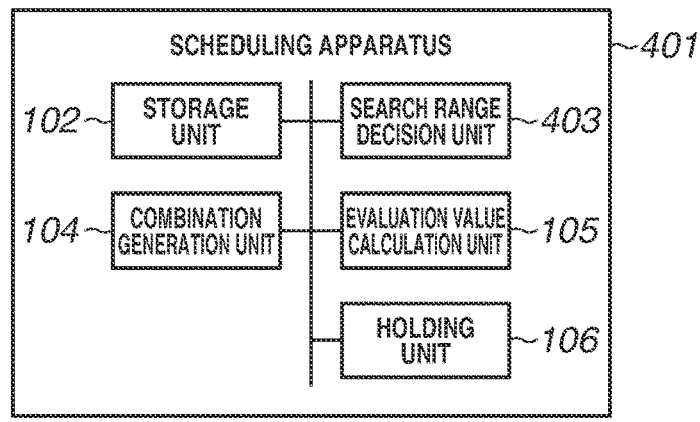
FIG. 9 is a block diagram showing the arrangement of a scheduling apparatus according to the fourth embodiment of the present invention.

A scheduling apparatus 401 according to the fourth embodiment of the present invention will be described next with reference to FIG. 9. The scheduling apparatus 401 includes a storage unit 102, a search range decision unit 403, a combination generation unit 104, an evaluation value calculation unit 105, and a holding unit 106. The scheduling apparatus 401 performs scheduling by searching for an optimum combination of one of a plurality of transmission points and a user wireless terminal, which is used to allocate a wireless resource to perform wireless communication, in a wireless network including a plurality of transmission points that perform wireless communication with user wireless terminals.

The storage unit 102, the combination generation unit 104, the evaluation value calculation unit 105, and the holding unit 106 are the same as in the above-described first embodiment. In the fourth embodiment, the search range decision unit 403 sets combination limitation information that restricts the number of the plurality of transmission points that can be combined with one user wireless terminal to the narrow-down count, based on the combination conditions stored in the storage unit 102 in the combinations of the user wireless terminals and the plurality of transmission points, for which channel information representing the wireless radio wave state between the user wireless terminal and each of the plurality of transmission points is equal to or greater than a set threshold.

The search range decision unit 103 according to the first embodiment sets the combination limitation information as shown in Table 3. In addition, according to the search range decision unit 403 of the fourth embodiment, the combinations of user wireless terminals and transmission points, for which the channel information is equal to or greater than the set threshold, are targets. For example, when the narrow-down count is 2, the combination of transmission point 0 and user wireless terminal 3 and the combination of transmission point 3 and user wireless terminal 0, for which the channel information is less than the threshold, are excluded based on the combination limitation information shown in Table 3, and combination limitation information shown in Table 8 below is set.

TABLE 8

| Transmission point 0 | Transmission point 1 | Transmission point 2 | Transmission point 3 |
|---|---|---|---|
| User wireless terminal 0 | User wireless terminal 1 | User wireless terminal 2 | User wireless terminal 5 |
| User wireless terminal 1 | User wireless terminal 4 | User wireless terminal 3 | User wireless terminal 6 |
| User wireless terminal 2 | | User wireless terminal 7 | User wireless terminal 7 |
| User wireless terminal 4 | | | |

Figure 10:
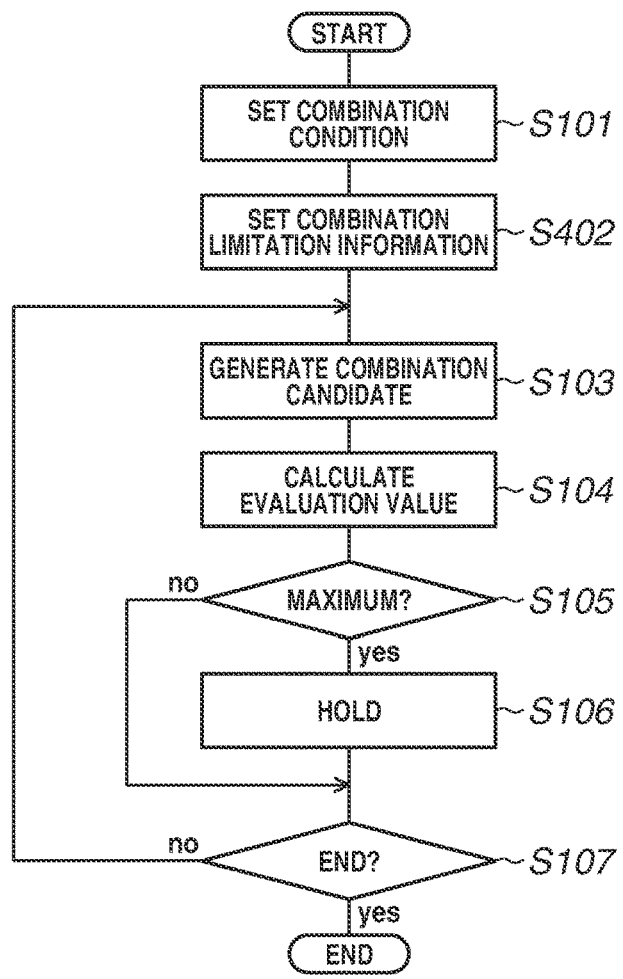
FIG. 10 is a flowchart for explaining a scheduling method according to the fourth embodiment of the present invention.

The operation (scheduling method) of the scheduling apparatus according to the fourth embodiment will be described next with reference to the flowchart of FIG. 10.

First, in step S101, combination conditions in each of which each of a plurality of transmission points configured to perform wireless communication with a user wireless terminal is associated with the user wireless terminal that is a connection candidate for the plurality of transmission points are stored in the storage unit 102 (first step). This is the same as in the above-described first embodiment.

In the fourth embodiment, next, in step S402, the search range decision unit 403 decides the narrow-down count based on the number of target user wireless terminals in accordance with preset narrow-down conditions, and sets combination limitation information that restricts the number of the plurality of transmission points that can be combined with one user wireless terminal to the narrow-down count, which is obtained based on the combination conditions stored in the storage unit 102 in the combinations of the user wireless terminals and the plurality of transmission points, for which channel information representing the wireless radio wave state between the user wireless terminal and each of the plurality of transmission points is equal to or greater than a set threshold (second step).

The subsequent processing is the same as in the above-described first embodiment. In step S103, the combination generation unit 104 generates candidates of combinations of the plurality of transmission points and the user wireless terminals based on the combination limitation information (third step). In step S104, the evaluation value calculation unit 105 calculates an evaluation value for each of the combination candidates generated by the combination generation unit 104 in the third step based on a standard that is set in advance (fourth step).

In step S105, the holding unit 106 first compares an already held evaluation value with the evaluation value newly calculated by the evaluation value calculation unit 105. When the evaluation value newly calculated by the evaluation value calculation unit 105 is greater (yes in step S105), in step S106, the holding unit 106 changes the held combination information to the combination for which the new evaluation value is calculated. Steps S103 to S106 described above are repetitively executed until the end (step S107).

In the above-described fourth embodiment as well, the narrow-down count is decided based on the number of target user wireless terminals, and the number of the plurality of transmission points that can be combined with one user wireless terminal is restricted to the decided narrow-down count which is obtained based on combination conditions. It is therefore possible to more quickly decide the optimum combination of a transmission point and a user wireless terminal.

In the fourth embodiment, combination limitation information is set in the combinations of the user wireless terminals and the transmission points, for which channel information representing the wireless radio wave state between the user wireless terminal and each of the plurality of transmission points is equal to or greater than a set threshold. Hence, only when the channel information is satisfactory, a user wireless terminal can be a connection candidate for each transmission point. Hence, as compared to the first embodiment, it is possible to exclude the combination of a transmission point and a user wireless terminal for which the channel information is not satisfactory from search processing and shorten the time needed to specify an optimum combination.

Fifth Embodiment

Figure 11:
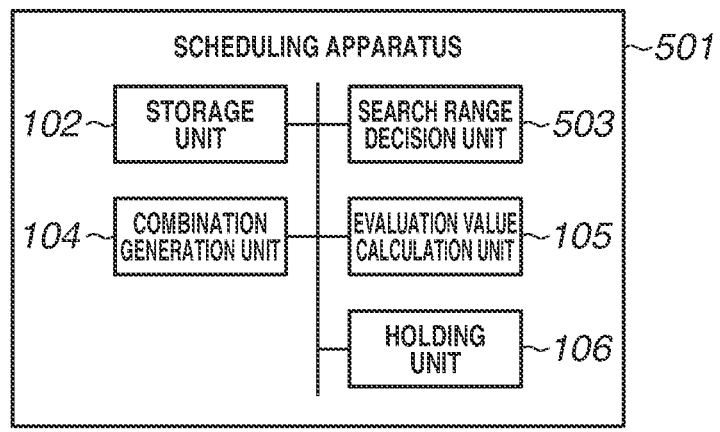
FIG. 11 is a block diagram showing the arrangement of a scheduling apparatus according to the fifth embodiment of the present invention.
Figure 12:
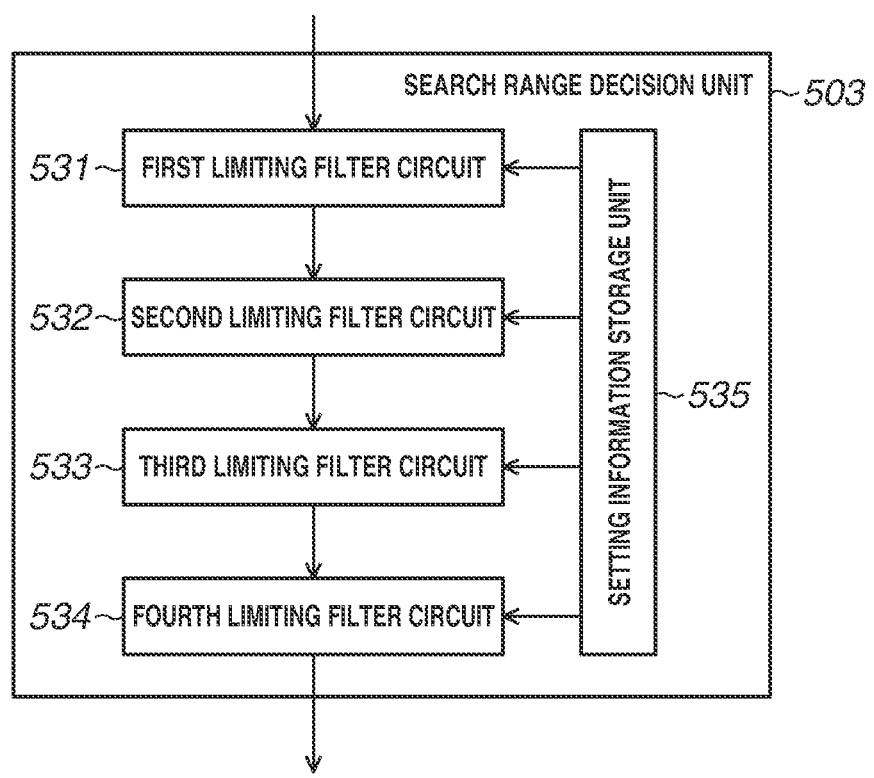
FIG. 12 is a block diagram showing a partial arrangement of the scheduling apparatus according to the fifth embodiment of the present invention.

A scheduling apparatus 501 according to the fifth embodiment of the present invention will be described next with reference to FIGS. 11 and 12. The scheduling apparatus 501 includes a storage unit 102, a search range decision unit 503, a combination generation unit 104, an evaluation value calculation unit 105, and a holding unit 106. The scheduling apparatus 501 performs scheduling by searching for an optimum combination of one of a plurality of transmission points and a user wireless terminal, which is used to allocate a wireless resource to perform wireless communication, in a wireless network including a plurality of transmission points that perform wireless communication with user wireless terminals. The storage unit 102, the combination generation unit 104, the evaluation value calculation unit 105, and the holding unit 106 are the same as in the above-described first embodiment.

The search range decision unit 503 is formed by a first limiting filter circuit 531, a second limiting filter circuit 532, a third limiting filter circuit 533, a fourth limiting filter circuit 534, and a setting information storage unit 535. In the setting information storage unit 535, setting information representing an enable or disable state of an operation is set for each of the first limiting filter circuit 531, the second limiting filter circuit 532, the third limiting filter circuit 533, and the fourth limiting filter circuit 534.

Based on the setting information stored in the setting information storage unit 535, the search range decision unit 503 sets limitation information by combining some circuits of the first limiting filter circuit 531, the second limiting filter circuit 532, the third limiting filter circuit 533, and the fourth limiting filter circuit 534. Note that the search range decision unit 503 need not include all the first limiting filter circuit 531, the second limiting filter circuit 532, the third limiting filter circuit 533, and the fourth limiting filter circuit 534, and need only include at least two circuits.

The first limiting filter circuit 531 first decides, as the narrow-down count, the number of transmission points for which each of the user wireless terminals becomes a connection candidate based on the number of user wireless terminals that perform wireless communication with one of the plurality of transmission points. Additionally, the first limiting filter circuit 531 restricts, based on combination conditions stored in the storage unit 102, the number of the plurality of transmission points that can be combined with one user wireless terminal to the narrow-down count, and sets combination limitation information that associates the plurality of transmission points with user wireless terminals that are connection candidates for each of the plurality of transmission points. The first limiting filter circuit 531 corresponds to the search range decision unit 103 according to the first embodiment. For example, as shown in Table 1, a narrow-down count corresponding to a terminal count threshold is set in advance, and the narrow-down count is decided based on the number of target user wireless terminals. For example, when the number of target user wireless terminals is 10, it is smaller than a terminal count threshold of 32, and the narrow-down count is 8. In this example, the larger the number of target user wireless terminals is, the smaller the narrow-down count.

In addition, when the operation of the first limiting filter circuit 531 is enabled, combination limitation information that restricts the number of the plurality of transmission points that can be combined with one user wireless terminal to the decided narrow-down count which is set based on the combination conditions stored in the storage unit 102 or combination limitation information. For example, as shown in Table 2, the storage unit 102 stores combination conditions in which connection candidates of user wireless terminals are associated with each transmission point. On the other hand, when the narrow-down count is 2, combination limitation information that restricts the number of the plurality of transmission points that can be combined per a single user wireless terminal to 2 is being set, as shown in Table 3.

The second limiting filter circuit 532 restricts, based on combination conditions stored in the storage unit 102, the number of the plurality of transmission points that can be combined with one user wireless terminal to a narrow-down count, and additionally, sets combination limitation information in a state in which only a retransmission user wireless terminal is combined with a transmission point that is to be combined with a retransmission user wireless terminal as a retransmission target. The function of the second limiting filter circuit 532 corresponds to the search range decision unit 203 according to the second embodiment. In addition, the second limiting filter circuit 532 restricts the combination limitation information in a state in which only a retransmission user wireless terminal is combined with a transmission point that is to be combined with a retransmission user wireless terminal as a retransmission target based on the combination limitation information output from the first limiting filter circuit 531.

The third limiting filter circuit 533 restricts, based on combination conditions stored in the storage unit 102, the number of the plurality of transmission points that can be combined with one user wireless terminal to a narrow-down count, and additionally, sets combination limitation information that limits and restricts the number of user wireless terminals that can be combined with the plurality of transmission points to the narrow-down count. The third limiting filter circuit 533 corresponds to the search range decision unit 303 according to the third embodiment. In addition, the third limiting filter circuit 533 sets, based on the combination limitation information output from the first limiting filter circuit 531 or the combination limitation information output from the second limiting filter circuit 532, combination limitation information that restricts the number of user wireless terminals that can be combined with the plurality of transmission points to the narrow-down count.

The fourth limiting filter circuit 534 sets combination limitation information that restricts the number of the plurality of transmission points that can be combined with one user wireless terminal to the narrow-down count, based on the combination conditions stored in the storage unit 102 in the combinations of the user wireless terminals and the plurality of transmission points, for which channel information representing the wireless radio wave state between the user wireless terminal and each of the plurality of transmission points is equal to or greater than a set threshold. The fourth limiting filter circuit 534 corresponds to the search range decision unit 403 according to the fourth embodiment.

The fourth limiting filter circuit 534 sets combination limitation information that restricts the number of the plurality of transmission points that can be combined per one user wireless terminal to the narrow-down count in the combinations of the user wireless terminals and the plurality of transmission points, for which channel information representing the wireless radio wave state between the user wireless terminal and each of the plurality of transmission points is equal to or greater than a set threshold, based on the combination limitation information output from the first limiting filter circuit 531, the combination limitation information output from the second limiting filter circuit 532, or the combination limitation information output from the third limiting filter circuit 533.

Note that the search range decision unit 503 is assumed to execute the above-described decision of the narrow-down count and the setting of the combination limitation information for each scheduling cycle at the shortest. However, the processing need not necessarily be executed for each scheduling cycle. For example, the processing may be performed every time 10 scheduling cycles have elapsed, thereby omitting the processing of the search range decision unit. In this case, combination limitation information used in a cycle before a scheduling cycle of interest is used.

Note that an example in which the search range decision unit 503 executes the above-described decision of the narrow-down count and the setting of the combination limitation information by an arbitrary combination of the first limiting filter circuit 531, the second limiting filter circuit 532, the third limiting filter circuit 533, and the fourth limiting filter circuit 534 has been described. The combination need not always be static. For example, the setting of the combination may dynamically be changed in accordance with the number of user terminals. When the number of user terminals is large, all the four filter circuits are enabled to decrease the number of user terminals included in combination limitation information. When the number of user terminals is small, only the second limiting filter circuit 532 is enabled, and the remaining filter circuits are disabled.

When the processing performance of the scheduling processing apparatus reaches performance needed to search for an optimum combination for the scheduling cycle, only the second limiting filter circuit 532 is enabled, and the remaining filter circuits are disabled. When the number of filter processes to be enabled is decreased, it is possible to more accurately search for an optimum combination. When the processing performance of the scheduling processing apparatus does not reach performance needed to search for an optimum combination for the scheduling cycle, a plurality of filter circuits are enabled, thereby narrowing down candidates when searching for an optimum combination. Since the processing performance of the scheduling processing apparatus need not be made high, an effect of reducing cost can be obtained.

In addition, the scheduling processing apparatus can grasp the wireless radio wave state (channel information) of an area of interest, as described above. Hence, when channel information is satisfactory with respect to a certain threshold, a limiting filter circuit by a channel information threshold is enabled. On the other hand, when channel information is not satisfactory with respect to a certain threshold, a limiting filter circuit by a channel information threshold is disabled. In this way, the enable/disable setting of each filter circuit may dynamically or automatically be set.

Note that an example in which the search range decision unit 503 executes the above-described decision of the narrow-down count and the setting of the combination limitation information using an arbitrary combination of a plurality of filter circuits has been described. However, the order of combination is not always limited to this. For example, the processing of the second limiting filter circuit 532 may be executed first, and the processing of the first limiting filter circuit 531 may be executed at the subsequent stage. In addition, using the combination conditions acquired from the storage unit 102, processes of all filters of enabled settings may simultaneously be performed, and the results may be merged to obtain final combination limitation information. When the processes of the plurality of filters are simultaneously performed in this way, the filter processing can be completed in a shorter time as compared to a case in which the processes are sequentially performed.

Note that an example in which the search range decision unit 503 executes the above-described decision of the narrow-down count and the setting of the combination limitation information by arbitrarily combining the plurality of filter circuits using the same settings for the plurality of transmission points. However, the same settings need not always be used for the plurality of transmission points. For example, the enable/disable setting of a limiting filter circuit to be used may be changed between transmission point 0 and transmission point 1. In this case, the number of filters to be enabled is increased for a transmission point with a large number of user terminals, thereby further narrowing down user terminals as candidates. Conversely, the number of filters to be enabled is decreased for a transmission point with a small number of user terminals, thereby more accurately searching for an optimum combination.

Figure 13:
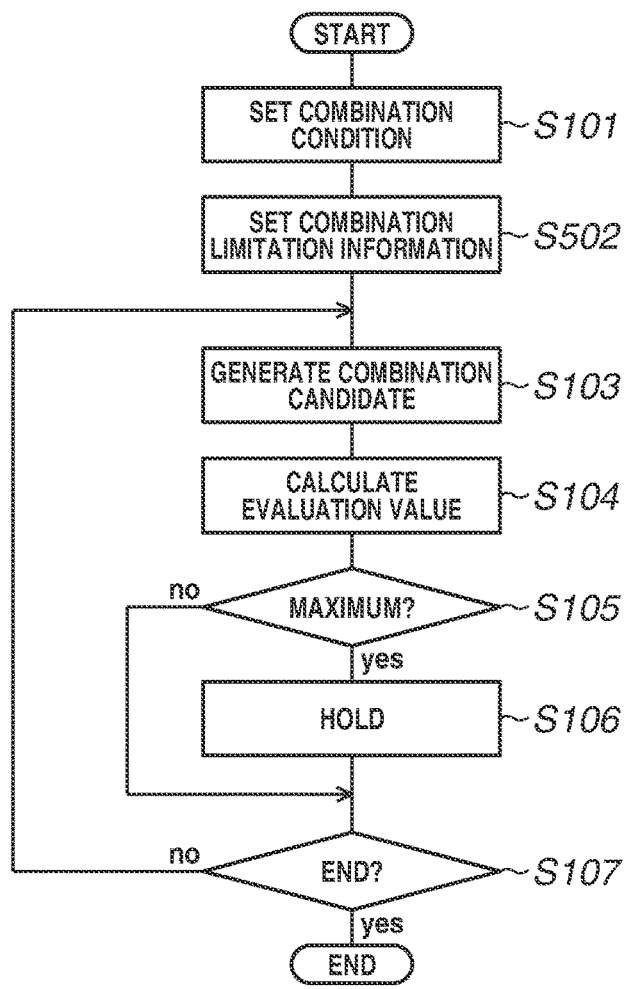
FIG. 13 is a flowchart for explaining a scheduling method according to the fifth embodiment of the present invention.

The operation (scheduling method) of the scheduling apparatus according to the fifth embodiment will be described next with reference to the flowchart of FIG. 13.

First, in step S101, combination conditions in each of which each of a plurality of transmission points configured to perform wireless communication with a user wireless terminal is associated with the user wireless terminal that is a connection candidate for the plurality of transmission points are stored in the storage unit 102 (first step). This is the same as in the above-described first embodiment.

In the fifth embodiment, next, in step S502, the search range decision unit 503 decides the narrow-down count based on the number of target user wireless terminals in accordance with preset narrow-down conditions, restricts the number of the plurality of transmission points that can be combined with a single user wireless terminal to the narrow-down count, that is obtained based on the combination conditions stored in the storage unit 102 when the first limiting filter circuit 531 is enabled based on the combination conditions stored in the storage unit 102, and sets combination limitation information that associates the plurality of transmission points with user wireless terminals that are connection candidates for each of the plurality of transmission points.

Additionally, when the second limiting filter circuit 532 is enabled, the search range decision unit 503 sets a state in which only a retransmission user wireless terminal is combined with a transmission point that is to be combined with a retransmission user wireless terminal as a retransmission target. Furthermore, when the third limiting filter circuit 533 is enabled, the search range decision unit 503 sets combination limitation information that restricts the number of user wireless terminals that can be combined with the plurality of transmission points to the narrow-down count.

Additionally, when the fourth limiting filter circuit 534 is enabled, the search range decision unit 503 sets combination limitation information that restricts the number of the plurality of transmission points that can be combined with one user wireless terminal to the narrow-down count in the combinations of the user wireless terminals and the plurality of transmission points, for which channel information representing the wireless radio wave state between the user wireless terminal and each of the plurality of transmission points is equal to or greater than a set threshold (second step).

Steps from step S103 are the same as in the above-described first embodiment. In step S103, the combination generation unit 104 generates candidates of combinations of the plurality of transmission points and the user wireless terminals based on the combination limitation information (third step). In step S104, the evaluation value calculation unit 105 calculates an evaluation value for each of the combination candidates generated by the combination generation unit 104 in the third step based on a standard that is set in advance (fourth step).

In step S105, the holding unit 106 first compares an already held evaluation value with the evaluation value newly calculated by the evaluation value calculation unit 105. When the evaluation value newly calculated by the evaluation value calculation unit 105 is greater (yes in step S105), in step S106, the holding unit 106 changes the held combination information to the combination for which the new evaluation value is calculated. Steps S103 to S106 described above are repetitively executed until the end (step S107).

In the above-described fifth embodiment as well, the narrow-down count is decided based on the number of target user wireless terminals, and the number of the plurality of transmission points that can be combined with one user wireless terminal is restricted to the decided narrow-down count that is obtained based on combination conditions. It is therefore possible to more quickly decide the optimum combination of a transmission point and a user wireless terminal.

In the fifth embodiment, it is possible to selectively use the functions described in the above-described first to fourth embodiments or use them in an arbitrary combination without changing the internal arrangement and circuit description of the scheduling apparatus. Hence, as compared to a case in which each of the scheduling apparatuses according to the first to fourth embodiments is solely used, the number of user terminals included in the combination limitation information can be decreased, and the time needed to specify an optimum combination can be shortened. In addition, since the internal arrangement and circuit description of the scheduling apparatus need not be changed, it is possible to meet the requirements of a greater number of system service providers, and as a result, the cost can be reduced.

Figure 14:
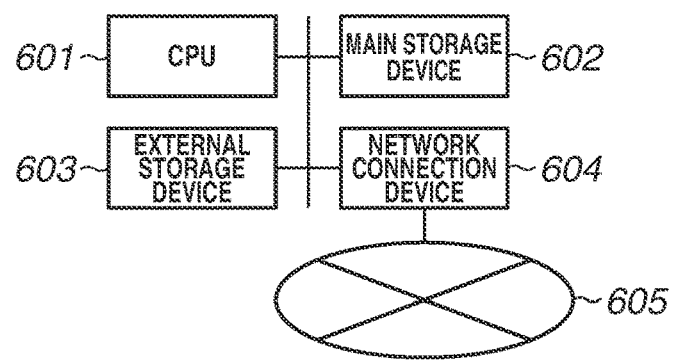
FIG. 14 is a block diagram showing the hardware arrangement of the scheduling apparatus according to the present invention.

Note that the scheduling apparatus according to the above-described embodiment may be a computer apparatus including a CPU (Central Processing Unit) 601, a main storage device 602, an external storage device 603, a network connection device 604, and the like, as shown in FIG. 14. Each function (scheduling method) described above may be implemented when the CPU 601 operates by a program loaded into the main storage device (a program is executed). The program is a program used by the computer to execute the scheduling method shown in the above-described embodiment. The network connection device 604 is connected to a network 605. The functions can also be distributed to a plurality of computer apparatuses.

The scheduling apparatus according to the above-described embodiment can also be formed by a PLD (Programmable Logic Device) such as an FPGA (Field-Programmable Gate Array). For example, when the storage unit, the search range decision unit, the combination generation unit, the evaluation value calculation unit, and the holding unit are provided as circuits in the logic elements of an FPGA, the FPGA can be made to function as the scheduling apparatus. Each of the storage circuit, the search range decision circuit, the combination generation circuit, the evaluation value calculation circuit, and the holding circuit is written in the FPGA by connecting a predetermined writing device.

An FPGA in which a circuit serving as the search range decision unit 103 according to the first embodiment is written as a search range decision circuit (first limiting filter circuit) can be made to function as the scheduling apparatus according to the first embodiment. An FPGA in which a circuit serving as the search range decision unit 203 according to the second embodiment is written as a search range decision circuit (second limiting filter circuit) can be made to function as the scheduling apparatus according to the second embodiment.

An FPGA in which a circuit serving as the search range decision unit 303 according to the third embodiment is written as a search range decision circuit (third limiting filter circuit) can be made to function as the scheduling apparatus according to the third embodiment. An FPGA in which a circuit serving as the search range decision unit 403 according to the fourth embodiment is written as a search range decision circuit (fourth limiting filter circuit) can be made to function as the scheduling apparatus according to the fourth embodiment. An FPGA in which a first limiting filter circuit, a second limiting filter circuit, a third limiting filter circuit, a fourth limiting filter circuit, and a setting information storage circuit, which serve as the search range decision unit 503 according to the fifth embodiment, are written can be made to function as the scheduling apparatus according to the fifth embodiment.

The above-described circuits written in the FPGA can be confirmed by the writing device connected to the FPGA.

As described above, according to the present invention, the narrow-down count is decided based on the number of target user wireless terminals, and the number of a plurality of transmission points that can be combined with one user wireless terminal is limited by the decided narrow-down count based on a combination condition. It is therefore possible to more quickly decide the optimum combination of a transmission point and a user wireless terminal.

Note that the present invention is not limited to the above-described embodiments, and it is obvious that many modifications and combinations can be made by a person with normal knowledge in the field within the technical scope of the present invention.

EXPLANATION OF THE REFERENCE NUMERALS AND SIGNS

101 . . . scheduling apparatus, 102 . . . storage unit, 103, 203, 303, 403 . . . search range decision unit, 104 . . .

combination generation unit, 105 . . . evaluation value calculation unit, 106 . . . holding unit.

The invention claimed is:

1. A scheduling apparatus comprising:
a storage unit configured to store combination conditions in each of which each of a plurality of transmission points configured to perform wireless communication with a user wireless terminal is associated with the user wireless terminal that is a connection candidate for the plurality of transmission points;
a search range decision unit configured to decide, as a narrow-down count, the number of transmission points for which each of user wireless terminals becomes a connection candidate based on the number of user wireless terminals that perform wireless communication with one of the plurality of transmission points, limit, based on the combination conditions stored in the storage unit, the number of the plurality of transmission points that can be combined with one of the user wireless terminals according to the narrow-down count, and set combination limitation information that associates the plurality of transmission points with the user wireless terminals that are the connection candidates for each of the plurality of transmission points;
a combination generation unit configured to generate candidates of combinations of the plurality of transmission points and the user wireless terminals based on the combination limitation information;
an evaluation value calculation unit configured to calculate, based on a standard that is set in advance, an evaluation value for each of the candidates of the combinations generated by the combination generation unit; and
a holding unit configured to hold a combination selected based on the evaluation value calculated by the evaluation value calculation unit.

2. The scheduling apparatus according to claim 1, wherein the search range decision unit limits, based on the combination conditions stored in the storage unit, the number of the plurality of transmission points that can be combined with one user wireless terminal according to the narrow-down count, and additionally, sets the combination limitation information in a state in which only a retransmission user wireless terminal is combined with a transmission point that is to be combined with a retransmission user wireless terminal as a retransmission target.

3. The scheduling apparatus according to claim 2, wherein the combination generation unit generates the candidate of the combination by selecting a transmission point in accordance with the wireless radio wave state of each of the plurality of transmission points.

4. A non-transitory computer readable medium storing a program causing a computer to function as a storage unit, a search range decision unit, a combination generation unit, an evaluation value calculation unit, and a holding unit provided in a scheduling apparatus described in claim 3.

5. A non-transitory computer readable medium storing a program causing a computer to function as a storage unit, a search range decision unit, a combination generation unit, an evaluation value calculation unit, and a holding unit provided in a scheduling apparatus described in claim 2.

6. The scheduling apparatus according to claim 1, wherein the search range decision unit limits, based on the combination conditions stored in the storage unit, the number of the plurality of transmission points that can be combined with one user wireless terminal according to the narrow-down count, and additionally, sets the combination limitation information that limits the number of user wireless terminals that can be combined with the plurality of transmission points according to the narrow-down count.

7. The scheduling apparatus according to claim 6, wherein the combination generation unit generates the candidate of the combination by selecting a transmission point in accordance with the wireless radio wave state of each of the plurality of transmission points.

8. A non-transitory computer readable medium storing a program causing a computer to function as a storage unit, a search range decision unit, a combination generation unit, an evaluation value calculation unit, and a holding unit provided in a scheduling apparatus described in claim 7.

9. A non-transitory computer readable medium storing a program causing a computer to function as a storage unit, a search range decision unit, a combination generation unit, an evaluation value calculation unit, and a holding unit provided in a scheduling apparatus described in claim 6.

10. The scheduling apparatus according to claim 1, wherein the search range decision unit sets, based on the combination conditions stored in the storage unit, the combination limitation information that limits the number of the plurality of transmission points that can be combined with one user wireless terminal according to the narrow-down count in combinations of the user wireless terminals and the plurality of transmission points, for which channel information representing a wireless radio wave state between the user wireless terminal and each of the plurality of transmission points is equal to or greater than a set threshold.

11. The scheduling apparatus according to claim 10, wherein the combination generation unit generates the candidate of the combination by selecting a transmission point in accordance with the wireless radio wave state of each of the plurality of transmission points.

12. A non-transitory computer readable medium storing a program causing a computer to function as a storage unit, a search range decision unit, a combination generation unit, an evaluation value calculation unit, and a holding unit provided in a scheduling apparatus described in claim 11.

13. A non-transitory computer readable medium storing a program causing a computer to function as a storage unit, a search range decision unit, a combination generation unit, an evaluation value calculation unit, and a holding unit provided in a scheduling apparatus described in claim 10.

14. The scheduling apparatus according to claim 1, wherein the combination generation unit generates the candidate of the combination by selecting a transmission point in accordance with the wireless radio wave state of each of the plurality of transmission points.

15. A non-transitory computer readable medium storing a program causing a computer to function as a storage unit, a search range decision unit, a combination generation unit, an evaluation value calculation unit, and a holding unit provided in a scheduling apparatus described in claim 14.

16. A non-transitory computer readable medium storing a program causing a computer to function as a storage unit, a search range decision unit, a combination generation unit, an evaluation value calculation unit, and a holding unit provided in a scheduling apparatus described in claim 1.

17. A scheduling method comprising:
a first step of storing, in a storage unit, combination conditions in each of which each of a plurality of transmission points configured to perform wireless communication with a user wireless terminal is associated with the user wireless terminal that is a connection candidate for the plurality of transmission points;

a second step of deciding, as a narrow-down count, the number of transmission points for which each of user wireless terminals becomes a connection candidate based on the number of user wireless terminals that perform wireless communication with one of the plurality of transmission points, limiting, based on the combination conditions stored in the storage unit, the number of the plurality of transmission points that can be combined with one of the user wireless terminals according to the narrow-down count, and setting combination limitation information that associates the plurality of transmission points with the user wireless terminals that are the connection candidates for each of the plurality of transmission points;

a third step of generating candidates of combinations of the plurality of transmission points and the user wireless terminals based on the combination limitation information;

a fourth step of calculating, based on a standard that is set in advance, an evaluation value for each of the candidates of the combinations generated in the third step; and a fifth step of holding a combination selected based on the evaluation value calculated in the fourth step.

* * * * *